July 7, 1959   G. SCHAFER   2,893,041
WINDSHIELD WIPER WITH MAGNETICALLY ACTUATED FLEXIBLE BLADE
Filed Aug. 1, 1958   3 Sheets-Sheet 1
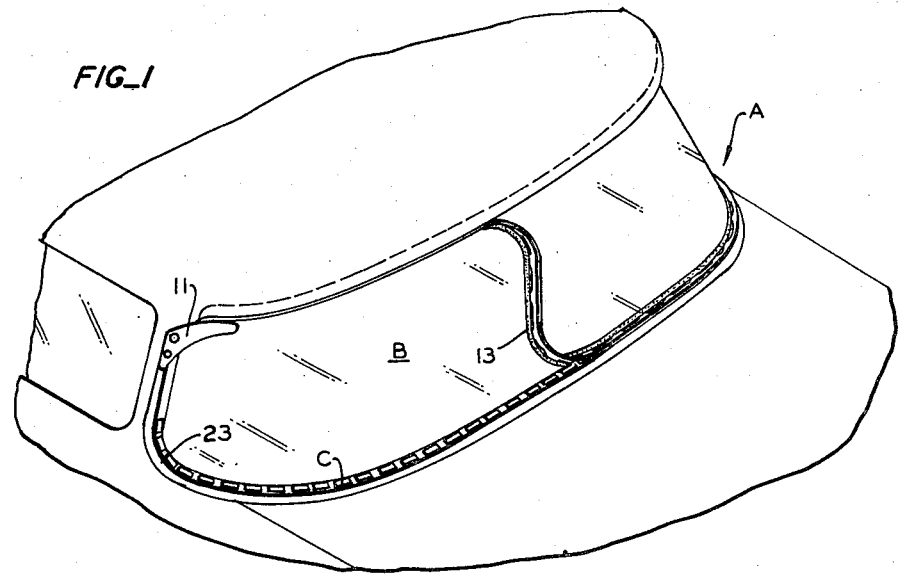
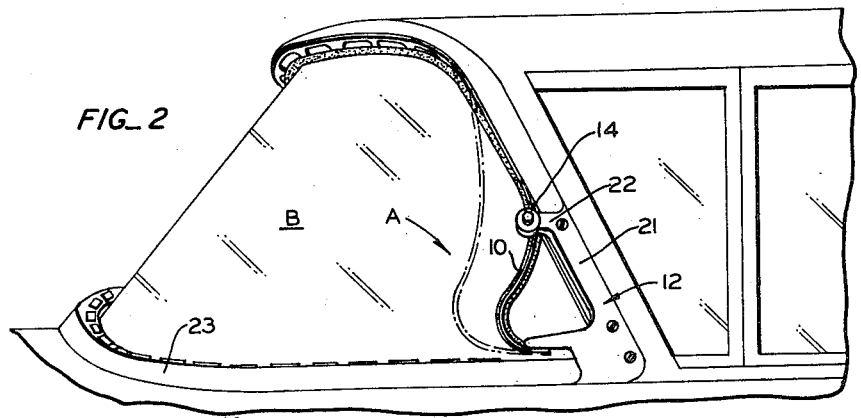
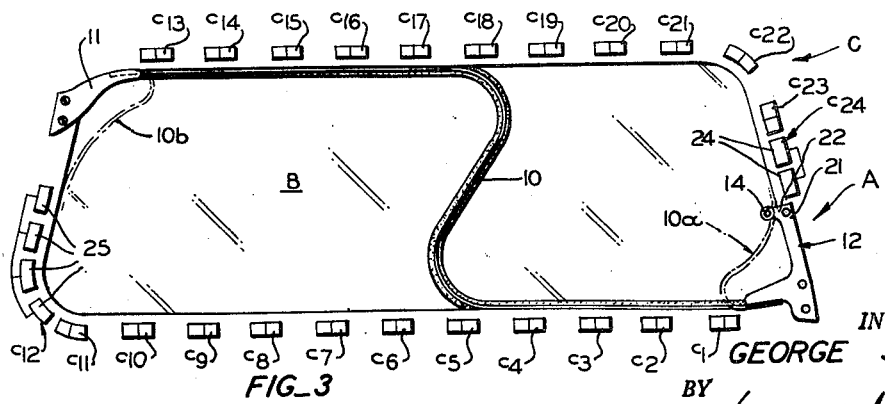
INVENTOR.
GEORGE SCHAFER
BY Hansen and Lane
ATTORNEYS July 7, 1959  G. SCHAFER  2,893,041
WINDSHIELD WIPER WITH MAGNETICALLY ACTUATED FLEXIBLE BLADE
Filed Aug. 1, 1958  3 Sheets-Sheet 2
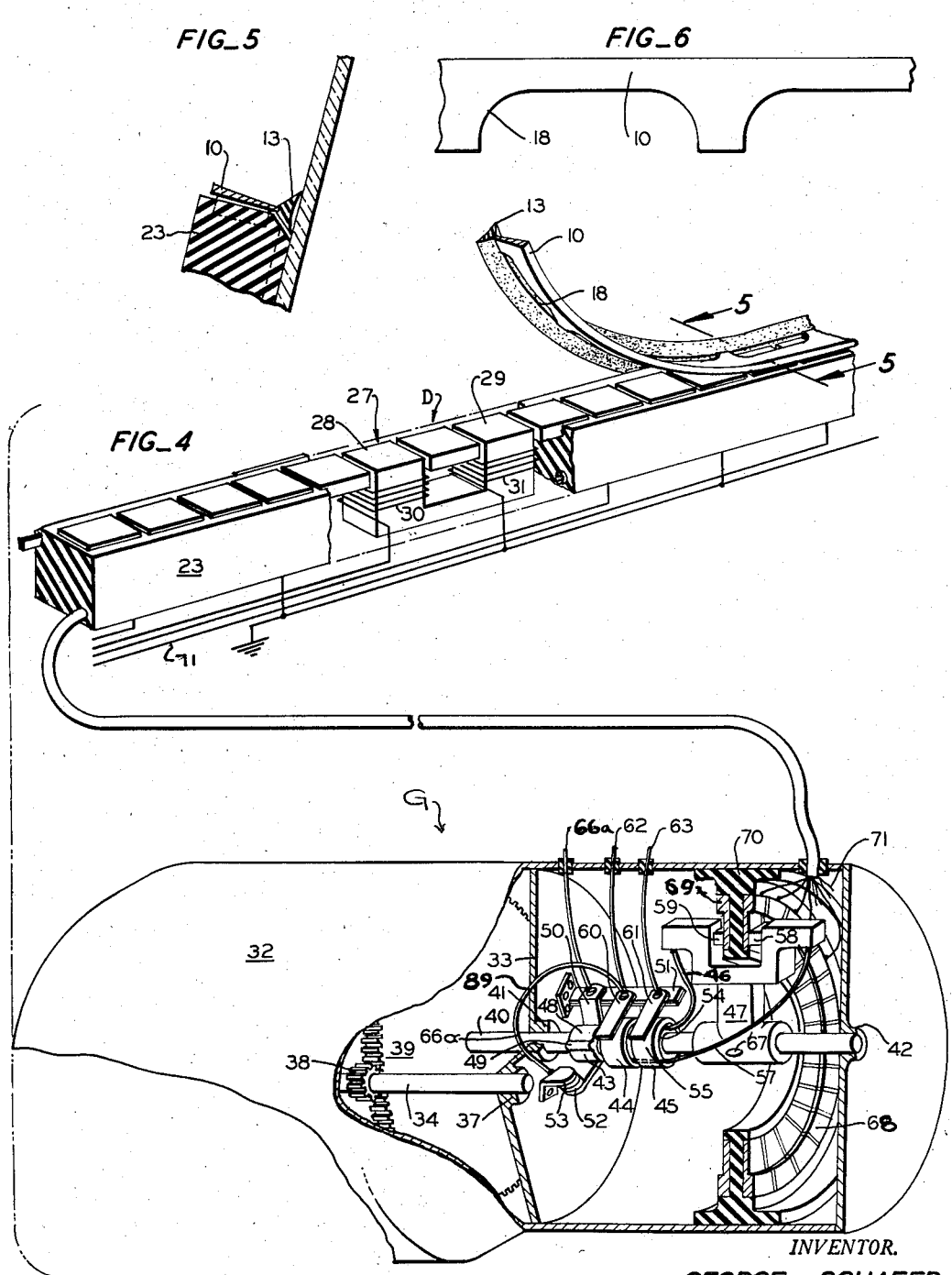
INVENTOR.
GEORGE SCHAFER
BY
ATTORNEYS July 7, 1959            G. SCHAFER            2,893,041
WINDSHIELD WIPER WITH MAGNETICALLY ACTUATED FLEXIBLE BLADE
Filed Aug. 1, 1958            3 Sheets-Sheet 3
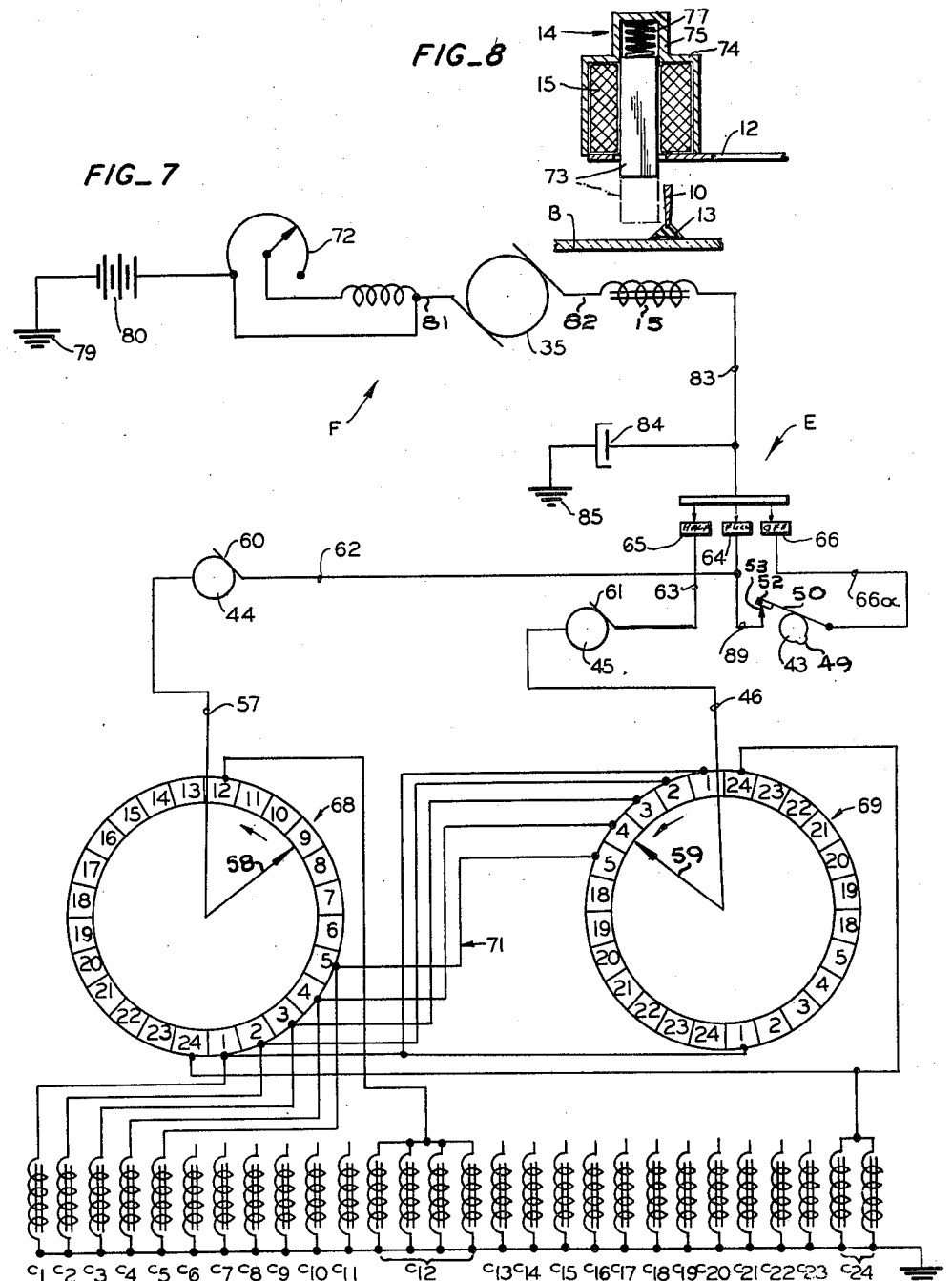
INVENTOR.
GEORGE SCHAFER
BY
Hansen and Lane
ATTORNEYS

United States Patent Office 2,893,041
Patented July 7, 1959

2,893,041

WINDSHIELD WIPER WITH MAGNETICALLY ACTUATED FLEXIBLE BLADE

George Schafer, Santa Clara, Calif.

Application August 1, 1958, Serial No. 752,572

7 Claims. (Cl. 15—253)

This invention relates to a windshield wiper, and pertains more particularly to a windshield wiper capable of being mounted on curved windshields or other surface areas, and of sweeping either substantially the entire area, or a portion thereof, as desired.

In recent years there has been a tendency to increase the size of automobile windshields, and also to curve marginal portions of such windshields in a so-called "wraparound" effect. The well known pivoted arm type of windshield wipers, which were satisfactory on flat windshields with relatively small areas, have been modified in various ways to attempt to sweep the larger, curved surfaces of the modern windshields. However, it frequently happens that in attempting to provide suitable wiping pressure for carrying the ends of the blades of such conventional wipers around the curved sides of the new windshields, excess pressure is placed on another portion of the wiper blade, which causes it to abrade the glass of the windshield. Also, where the ends of such windshield wiper blades are carried into over-hanging relation with the curved marginal portions of a windshield, such blade ends have a tendency to clear, or to be blown clear, of the glass of the windshield, which makes for unsatisfactory operation.

The present invention contemplates the provision of a windshield wiper which will provide a clear sweep throughout substantially the entire area of a windshield.

The invention also provides a windshield wiper having a flexible, ribbon-like blade, a progressive portion of which is adapted to sweep back and forth across a windshield even when marginal portions of such windshield are curved.

A further object of the invention is to provide a magnetically permeable, flexible windshield wiper strip, the ends of which are mounted on diagonally opposite corners to a windshield, and capable, by magnetic action, of being swept back and forth across the windshield, the flexible strip having a squeegee edge portion capable of wiping the window during its transit thereacross.

A still further object of the invention is to provide an improved windshield wiper capable of wiping either the entire transverse width of an automobile windshield, or of only a portion of such windshield, selectively as required.

These, and other objects and advantages of the invention, will be apparent from the following description and the accompanying drawings, wherein:

Fig. 1 is a fragmentary perspective view showing a portion of an automobile including the windshield thereof with a windshield wiper embodying the present invention mounted thereon.

Fig. 2 is a side elevational view of the structure shown in Fig. 1.

Fig. 3 is a somewhat diagrammatic front elevational view of the windshield and wiper mechanism of Figs. 1 and 2.

Fig. 4 is a fragmentary perspective view showing a portion of the wiper structure of Figs. 1 to 3, inclusive and including a motor driven switch mechanism, and an interconnecting electric conductor cable, portions being broken away.

Fig. 5 is a sectional view taken along line 5—5 of Fig. 4.

Fig. 6 is a fragmentary side elevational view of the metal, ribbon-like strip used for sweeping the windshield.

Fig. 7 is a schematic circuit diagram of the mechanism shown in Figs. 1–4.

Fig. 8 is an enlarged sectional view through the solenoid-released, spring-actuated, tape anchoring member.

Briefly, the illustrated embodiment A of the invention comprises a flexible, ribbon-like blade 10 of magnetically permeable material, such as, for example, steel, with opposite end portions thereof (Figs. 1, 2 and 3) held in brackets 11 and 12, respectively, mounted at diagonally opposite corners of a windshield B to be swept by the 10. A squeegee type wiping member 13 is mounted on the inner edge of the blade strip 10 for wiping engagement with the windshield B. A plurality of electromagnets C, with permanent magnets D alternately interposed therebetween, are mounted around the periphery of the windshield B. The electro-magnets C are energized in desired sequence by a rotary, commutator type of control G, to cause the blade 10 to sweep back and forth across a selected area of the windshield. The permanent magnets D, interposed between adjacent poles of each U-core electromagnet 27, and between adjacent electro-magnets C, tend to retain the wiper blade 10 in whatever position it may be left upon de-energization of the electro-magnets C.

Additionally, these interposed permanent magnets assist in maintaining the portion of the blade moving across the windshield under sufficient tension to insure good wiping contact with the windshield.

A solenoid actuated anchor 14, which is held retracted by the energization of its solenoid coil 15 (Fig. 8) during operation of the wiper blade 10, is positioned to engage and anchor the blade 10 in its solid line "off" position of Fig. 2 when a control switch E (Fig. 4) is in its "off" position and the electro-magnets C are de-energized.

Referring to the drawings in detail, the metal blade member 10 is of thin, magnetically permeable, flexible, springy material, such as spring steel tape, preferably coated or plated with a non-oxidizing material, such as, for example, chrome plating. This blade material also preferably is tapered slightly from its outer toward its inner edge as indicated in Figs. 4 and 5, and has a plurality of notches 18 along its inner edge to allow it to curve edgewise sufficiently to follow the contour of the windshield B at its curved marginal portions.

The rubber wiper member 13 is of suitable crosssectional configuration, and is mounted on the inner edge of the tape member 10 for wiping engagement with the windshield B which the device is adapted to clean. A suitable cross-sectional shape for this wiper member is indicated as in Figs. 4 and 5, but its shape is not material to the invention.

The tape mounting brackets 11 and 12 are secured one to each end of the tape 10, and are adapted to be mounted at diagonally opposite corners of the windshield B upon which the wiper is to be used. As will be noted, particularly in Fig. 3, these brackets hold the blade 10 so that its ends will be directed along the upper and lower edges, respectively, of the windshield.

The tape 10 is of such a length that when it is in its extreme limit of movement toward one side or the other of the windshield, as indicated in solid lines in Fig. 3, and in broken lines 10a and 10b, respectively, (Fig. 3) the tape will be permitted to curve from the bracket 11 or 12, as the case may be, around toward the side of the windshield, but will not be placed under sufficient tension to kink it. One tape mounting bracket 12 is provided with an upwardly extending portion 21 (Figs. 2 and 3) the latter having a forwardly extending arm 22 at its upper end. The solenoid-released, spring-actuated anchor 14 is mounted in the forward end of this arm 22.

The tape actuating electro-magnets C, and the alternately interposed permanent magnets D, are best shown in Fig. 4. The magnets C and D are embedded in a suitable mounting strip 23 of suitable insulative material such as, for example, vulcanized rubber which lends itself to sufficient flexing so as to conform to any desired curved shape.

With the exception of a pair 24 of single pole magnets at one end of the tape travel, and a group 25 of four single pole magnets at the other end of the tape travel, all of the electro-magnets employed are of the U-core type shown at 27 in Fig. 4. The poles 28 and 29, of each U-core magnet 27 are wound with usual coils 30 and 31, respectively, the coils 30 and 31 being connected together in series, with the exposed end of one pole 28, for example, of south-seeking polarity, and the exposed end of the other pole 29 of north-seeking polarity. The poles 28 and 29 of each U-core electro-magnet 27, and adjacent U-core magnets 27, are spaced apart and a permanent magnet D is mounted between each thereof. Thus, with the exception of the pair 24 of single pole electro-magnets, and the group 25 of four single pole electro-magnets, all of the exposed magnets around the windshield are alternately electro-magnets and permanent magnets.

The electro-magnets C surrounding the windshield B may be energized in selected sequence by means of the rotary switch G, which is mounted in a dust proof housing 32 having a transverse partition 33 therein. A drive shaft 34, which may be that of a conventional electric motor 35, indicated diagrammatically in Fig. 7, has one end thereof journaled in a bearing 37 provided therefor in the partition 33. A driven pinion 38 is secured co-axially to the shaft 34, and is in driving relation with a large, driven, spur gear 39 secured co-axially to a switch arm support shaft 40 journaled in bearings 41 and 42.

Secured to the switch arm support shaft 40 between the bearings 41 and 42, are, in sequence from left to right as shown in Fig. 4, a circuit breaker cam 43, a first wipe ring 44, a second wipe ring 45, and a switch arm 47. The circuit breaker cam 43 comprises a cylindrical low portion 48, co-axial with its supporting shaft 40, and a high point 49. The cam 43 is mounted adjacent a spring biased, electrically conductive strip 50, which may be of suitable spring metal, such as, for example, spring bronze.

The strip 50 is mounted on a support arm 51 secured to the partition 33, and is electrically insulated in a well known manner from such arm. A contact point 52 is mounted on the free end of the strip 50, and is normally urged, by the spring bias of the strip 50, to swing the latter toward the cam 43 and thereby to urge the contact point 52, toward contact with a second contact point 53, mounted on the partition 33 and electrically insulated therefrom. When the cylindrical low portion 48 of the cam 43 is opposite the strip 50, it allows the spring bias of said strip to urge the points 52 and 53 to closed condition. When the high point 49 of said cam engages the contact strip 50, however, it swings the latter downwardly and thereby separates these points.

Both the wipe rings 44 and 45 are of generally similar construction, comprising electrically insulative hub portions 54 and electrically conductive rim portions 55. A conductor 57 is electrically connected to the rim portion 55 of the first wipe ring 44, passes through the insulative hub portion 54 of the second wipe ring 45, and is connected to a contact brush 58 mounted in one side of the outer end of the rotary switch arm 47. The brush 58 may be of the conventional spring pressed, carbon block type commonly used in electric motors.

The electrically conductive rim portion of the second wipe ring 45 is connected by a conductor 46 to a similar brush block 59 mounted in the opposite side of the outer end of the rotary switch arm 47.

A pair of spring contact strip brushes 60 and 61, which are mounted in electrically insulated relation on the support arm 51, ride on the wipe rings 44 and 45, respectively, and are connected by conductors 62 and 63, respectively, to contacts 64 and 65, respectively, of the three-position control switch E (Fig. 7). A third contact 66 of the control switch E is connected by conductor 66a to the cam actuated spring strip 50.

The rotary switch arm 47 preferably is of electrically insulative material, such as, for example, a molded phenolic condensation product, and is secured to the shaft 40 by a set screw 67.

The brush blocks 58 and 59 are mounted for successive wiping engagement with two sets of electrically conductive segments 68 and 69, respectively, mounted, commutator-like, around opposite sides of an insulative ring 70 mounted co-axially within the housing 32. Counting the pair 24 of single pole magnets, and the group 25 of four single pole magnets as single magnets, and each of the U-core magnets 27 as a single magnet, as many segments 68 and 69 are provided on each side of the insulative ring 70 as there are electromagnets C about the periphery of the windshield B. This is apparent from Figs. 3 and 7, wherein there are 24 such electromagnets and (Fig. 7) 24 of each set of segments 68 and 69. The segments 68, for causing full-sweep electrical operation of the blade 10, are connected by cabled conductor wires 71 (Fig. 4), to successive magnets C in such a way, that, starting at the lower right hand corner of the windshield, as shown in Fig. 3, the magnets will be energized in sequence from C–1 to C–24 in a clockwise direction about the windshield.

In the event that it should be desired to increase the tempo of tape movement back and forth across only the driver's half of the windshield, which might be necessary to clear the windshield in a severe storm, the brush 59 and segments 69 on the opposite side of the insulative ring 70 are employed. These segments 69 are connected in sequence from magnets C–1 to C–5, and then from C–18 to C–24. During the traversing in sequence of the segments 69 connected to the electro-magnets C–1 to C–5 by the brush 69, the tape is moved thereby from its broken line starting position 10a of Fig. 3, to its solid line medial position of Fig. 3. Then, during the traversing of the segments 69 connected to the electro-magnets C–18 to C–24 the tape is returned thereby to its broken line starting position 10a of Fig. 3. This half-sweep cycle requires the use of only twelve segments 69, and is completed during the first half revolution of the rotary switch arm 47. This half-sweep cycle is repeated during the second half of such rotation as will be apparent from the right hand numbered circle in Fig. 7 representing the segments 69. Thus, two half-sweeps of the blade 10 are accomplished by each rotation of the rotary switch arm 47 when the control switch E is set to energize the segments 69.

A conventional type of motor speed control mechanism 72 is indicated diagrammatically in Fig. 7. The use of this mechanism is optional, and is provided only if a variable rate of speed is required for the drive motor 35. Since such speed control mechanisms are well known, and since the use thereof is not material to the present invention, it will be unnecessary to illustrate or describe it in detail herein.

The anchor member 14, as shown sectionally in Fig. 8, is a conventional type of solenoid having a coil 15 and spring-biased core 73, the latter of which may be of soft iron. A cap 74 is provided over the outer end of the coil 15 and has a raised central portion 75 to permit the core 73 to move axially therein to longitudinally centered position in the coil 15 upon energization of the latter, thereby to release the wiper strip 10.

A coil spring 77 is mounted in compression between the cap 74 and the core 73, normally to urge the latter to its broken line, strip-anchoring position indicated in Fig. 8.

The operation of the illustrated embodiment A of the present invention is as follows: We will assume that the wiper strip 10 is anchored by the spring pressed solenoid core 73 in its "off" condition illustrated by broken lines 10a in Fig. 3 and that the three position control switch E (Fig. 7) is positioned to engage the right hand or "off" switch contact 66.

Upon operating the control switch E to engage the center, or "full sweep" contact 64 (Fig. 7) a circuit is thereby closed through an initial portion F of the circuit, common to all three positions of the control switch E. This initial circuit portion F extends from ground 79, through a usual battery 80, which may be the battery of the automobile in which the device is installed, the conventional motor speed control mechanism 72, conductor 81, drive motor 35, conductor 82, solenoid coil 15 and conductor 83 to the control switch E. A conventional condenser 84 also is connected from the conductor 83 to ground 85 to reduce arcing at the brushes 58 and 59.

Assuming that the control switch E is in its center or "full sweep" position illustrated in Fig. 7, current will flow through the initial portion F of the circuit and thence through the central switch contact 64, conductor 62, spring brush strip 60, wipe ring 44, conductor 57 and brush block 58 in the rotary switch arm 47.

Since the drive motor 35 is energized upon such flow of current the switch arm 47 is thereby rotatively driven to move the brush 58 around the successive segments 68 which it is adapted to sweep. Since said segments 68 are connected to successive electro-magnets C, and since said electro-magnets, as shown in Fig. 4, are connected to a common ground 88, upon such rotation of the switch arm 47 by the drive motor 35 the electro-magnets C, as shown in Figs. 1–3, will be energized successively in a clockwise direction about the periphery of the windshield B. Further, since the solenoid actuated anchor 14 is moved to strip-releasing position by energization of its coil 15 upon closing of such circuit through the initial circuit portion F, this successive energization of the electro-magnets C moves the wiper blade 10 in sinuous sweeps back and forth across the entire width of the windshield.

Should it be desired to increase the tempo of the sweep, and to sweep only half of the windshield, the control switch E may be operated to engage left hand, or half sweep contact point 65 (Fig. 7). Current then will flow through the initial portion F of the circuit, contact point 65, conductor 63, brush strip 61, second wipe ring 45, conductor 46, and brush block 59, to successive segments 69, as the brush is carried around by rotation of the arm 47.

As indicated diagrammatically in Fig. 7, during the first half of its rotative cycle about the segments 69, the brush 59 sweeps segments 69 connected to electro-magnets C–1 to C–5 in sequence and then sweeps the next seven segments 69 connected to electro-magnets C–18 to C–24 in sequence. During the second half of each such rotative cycle, the brush 59 again sweeps segments 69 connected to electro-magnets C–1 to C–5 and C–18 to C–24 to thereby repeat the half-sweep by the blade 10.

When it is desired to stop the wiper, the switch C is operated to engage the "off" position switch contact 66. Assuming that when the switch E is thus moved to its "off" position when the breaker points 52 and 53 are closed, and the rotary switch arm 47 is only part way around its cycle from either its "full sweep" central position, or its "half sweep" left hand position of Fig. 7, current then will flow through the initial portion F of the circuit, "off" switch contact 66, conductor 66a, spring biased strip 50, breaker points 52 and 53, and conductor 89 back to the "full sweep" brush strip 60. Since, as explained previously herein, the cam point 49 is positioned to open the breaker points 52 and 53 when the rotary switch arm has the brush 58 in engagement with the segment 68 connected to electro-magnet C–24, such operation of the control switch E allows the mechanism to complete its cycle of operation returning the blade 10 to its starting position, indicated by the broken line 10a in Fig. 1.

At this point in the rotative cycle of the switch arm 47, the high point 49 of the cam 43 depresses the spring strip 50, thereby opening the breaker points 52 and 53, and de-energizing the circuit. This, of course, de-energizes the motor 35 to stop further rotation of the switch arm 47, and also de-energizes the solenoid coil 15, whereupon the spring 77 urges the core 73 to its broken line, anchoring position of Fig. 8. Since the wiper blade 10 was, at the moment of de-energization of the circuit, held in its extreme right hand position by the four single pole magnets 25, this actuation of the solenoid core 73 mechanically anchors the blade 10 in its "off" position indicated by the broken line 10a in Fig. 3.

The invention provides a windshield wiper capable of effectively wiping a curved windshield, and of sweeping subtantially its entire area. It has very few mechanically moving parts, and when properly installed should provide long, satisfactory, service free operation.

While I have illustrated and described a preferred embodiment of my invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A windshield wiper assembly comprising a ribbon-like blade of magnetically permeable metal, a squeegee-like wiper member mounted on an edge of said blade, bracket means for mounting said blade on the external side of a windshield and with the squeegee-like wiper member in wiping engagement therewith, said blade being of a length to lie along one side and one edge of the windshield, a plurality of electro-magnets mounted marginally about the windshield and with their poles exposed inwardly toward the windshield for successive engagement with the metal blade, and means for successively energizing said magnets about the windshield, thereby to draw said blade in sinuous sweeps back and forth across the windshield with the squeegee member in wiping contact therewith, thereby to clean the surface of the windshield.

2. A windshield wiper assembly comprising a ribbon-like blade of magnetically permeable metal, a squeegee-like wiper member mounted on an edge of said blade, bracket means for mounting said blade on the external side of a windshield and with the squeegee-like wiper member in wiping engagement therewith, said blade being of a length to lie along one side and one edge of the windshield, a plurality of electro-magnets mounted in spaced relation marginally about the windshield and with their poles exposed inwardly toward the windshield for successive engagement with the metal blade, a plurality of permanent magnets interposed in between the spaced electro-magnets and substantially flush with the inner ends thereof, thereby tending to retain the blade in contact therewith, and means for successively energizing said magnets about the windshield, thereby to draw said blade in sinuous sweeps back and forth across the windshield with the squeegee member in wiping contact therewith, thereby to clean the surface of the windshield.

3. A windshield wiper assembly comprising a ribbon-like blade of magnetically permeable metal, a squeegee-like wiper member mounted on an edge of said blade, bracket means for mounting said blade on the external side of a windshield and with the squeegee-like wiper member in wiping engagement therewith, said blade being of a length to lie along one side and one edge of the windshield, and having a plurality of notches in its inner edge of sufficient depth to allow edgewise flexing of the blade, a plurality of electro-magnets mounted in spaced relation marginally about the windshield and with their poles exposed inwardly toward the windshield for successive engagement with the metal blade, and means for successively energizing said magnets about the windshield, thereby to draw said blade in sinuous sweeps back and forth across the windshield with the squeegee member in wiping contact therewith, thereby to clean the surface of the windshield.

4. A windshield wiper assembly comprising a ribbon-like blade of magnetically permeable metal, a squeegee-like wiper member mounted on an edge of said blade, bracket means on each end of said blade and adapted to be mounted at diagonally opposite corners of a windshield for mounting said blade on the external side of such windshield and with the squeegee-like wiper member in wiping engagement therewith, said blade being of a length to lie along one side and one edge of the windshield, a plurality of electro-magnets mounted marginally about the windshield and with their poles exposed inwardly toward the windshield for successive engagement with the metal blade, electrical circuit means for successively energizing said electro-magnets about the windshield, thereby to draw said blade in sinuous sweeps back and forth across the windshield with the squeegee member in wiping contact therewith, thereby to clean the surface of the windshield, and a spring pressed, solenoid actuated anchor member mounted at one limit of movement of the blade, and adapted to be energized to release the blade upon closure of the circuit means, and to be de-energized to anchor the blade upon opening of the circuit means.

5. An arrangement according to claim 4 wherein the electro-magnet at each limit of blade movement is a multi-pole electro-magnet to draw the blade firmly toward such limit of movement.

6. A windshield wiper assembly comprising a ribbon-like blade of magnetically permeable metal, a squeegee-like wiper member mounted on an edge of said blade, bracket means on each end of said blade and adapted to be mounted at diagonally opposite corners of a windshield for mounting said blade on the external side of a windshield and with the squeegee-like wiper member in wiping engagement therewith, said blade being of a length to lie along one side and one edge of the windshield, a plurality of electro-magnets mounted marginally about the windshield and with their poles exposed inwardly toward the windshield for successive engagement with the metal blade, and a rotary switch comprising a motor driven rotary arm, a brush on a radially outward part of said arm, means for energizing said brush, a plurality of electrically conductive segments electrically connected one to each electro-magnet, and mounted in a circular pattern coaxially with said arm and positioned to be swept successively by said brush upon a rotation of said arm for successively energizing said electro-magnets about the windshield, thereby to draw said blade in sinuous sweeps back and forth across the windshield with the squeegee member in wiping contact therewith, thereby to clean the surface of the windshield.

7. A windshield wiper assembly comprising a flexible blade of magnetically permeable metal, a squeegee-like wiper member mounted on an edge of said blade, bracket means for mounting said blade on the external side of a windshield and with the squeegee-like wiper member in wiping engagement therewith, said blade being of a length to lie along one side and one edge of the windshield, a plurality of separate magnets mounted marginally about the windshield and arranged for successive magnetic attraction of the metal blade, and means for alternately energizing the magnets along opposite sides and edges of the windshield, thereby to draw said blade in sinuous sweeps back and forth across the windshield with the squeegee member in wiping contact therewith, thereby to clean the surface of the windshield.

References Cited in the file of this patent

UNITED STATES PATENTS 2,399,652   Rappl _____ May 7, 1956